United States Patent
Bar-Ness

[19]

[11] Patent Number: 6,137,785

[45] Date of Patent: Oct. 24, 2000

[54] WIRELESS MOBILE STATION RECEIVER STRUCTURE WITH SMART ANTENNA

[75] Inventor: Yeheskel Bar-Ness, Marlboro, N.J.

[73] Assignee: New Jersey Institute of Technology, Newark, N.J.

[21] Appl. No.: 09/042,948

[22] Filed: Mar. 17, 1998

[51] Int. Cl.$^7$ ...................................................... H04J 3/14
[52] U.S. Cl. .......................... 370/328; 375/346; 455/63
[58] Field of Search ..................................... 375/346, 347, 375/348, 349; 455/67.3, 67.1, 63, 524, 525, 501, 517, 575, 132; 370/252, 241, 334, 328, 342, 343, 345, 310

[56] References Cited

U.S. PATENT DOCUMENTS

| | | | |
|---|---|---|---|
| 5,471,647 | 11/1995 | Gerlach et al. ......................... | 455/63 |
| 5,634,199 | 5/1997 | Gerlach et al. ......................... | 455/63 |
| 5,659,584 | 8/1997 | Uesugi et al. ......................... | 375/347 |
| 5,819,168 | 10/1998 | Golden et al. ......................... | 455/303 |
| 5,905,721 | 5/1999 | Liu et al. ............................... | 370/342 |
| 6,006,110 | 12/1999 | Raleigh ................................... | 455/561 |

*Primary Examiner*—Huy D. Vu
*Attorney, Agent, or Firm*—Woodbridge & Associates, P.C.; Richard C. Woodbridge; Stuart H. Nissim

[57] ABSTRACT

This invention relates to a system and method utilizing a receiver architecture with a set of at least two antennae followed by a Rake demodulator at a mobile station for interference cancellation and diversity combining. Such a structure can work well only when the channel vector of desired signal is correctly estimated. The present invention makes use of the identifying spreading codes (as in IS-95 for example) to provide an adaptive channel vector estimate, to thereby cancel cochannel interference and improve the system capacity.

11 Claims, 2 Drawing Sheets

WIRELESS MOBILE STATION RECEIVER STRUCTURE WITH SMART ANTENNA

BACKGROUND OF THE INVENTION

1. Field of the Invention

This invention relates to a system and method of interference cancellation for use with respect to a mobile station having a smart antenna and a Rake demodulator.

2. Description of Related Art

The capacity of wireless Code Division Multiple Access (CDMA) systems in the forward link direction (i.e., from a base station to a mobile receiver) is limited by both intra-cell and inter-cell cochannel interferences. In particular, when the mobile unit is close to a cell boundary, the desired signal is disturbed by relatively strong interference from neighboring base stations. Antenna arrays have been previously suggested for base stations of CDMA systems to improve the capacity in the reverse link through space diversity and interference cancellation. Less attention is given to the forward link due to the reliance on orthogonal spreading codes to handle the cochannel interference. The performance in the forward link is limited, however, by multipath fading and inter-cell interference.

In IS-95 CDMA, signals from the same base station and same path are separated by a set of orthogonal codes (Walsh codes), which eliminate the interference of other users' signals in the same signal path from the home cell (see, for example, J. D. Gibson, *The Mobile Communications Handbook,* Boca Raton, Fla., CRC Press, Inc., 1996 and T. S. Rappaport, *Wireless Communications: Principles and Practice,* Upper Saddle River, N.J., Prentice Hall PTR, 1996). The other signal paths from a home base station, however, create self-interference. In addition, signals from different base stations are identified by a special short pseudo random code. Such base stations share the same short code, but with different shifts, and hence due to nonzero autocorrelation there exists inter-cell interference. The worst case occurs at the cell boundary point, where the desired signal is the weakest and the inter-cell interference is the strongest.

Similar to its use in the reverse link, an antenna array at the mobile station can be used as a diversity combiner to maximize the signal-to-interference plus noise ratio (SINR). Due to packaging and cost considerations, however, such an array needs to be small. A dual antenna mobile station for wireless communications has been suggested and its implementation was studied in a paper by M. Lefevre, M. A. Jensen, and M. D. Rice, ("Indoor measurements of handset dual-antenna diversity performance," in *IEEE 47$^{th}$ Vehicular Technology Conference Proceedings,* (Phoenix, Ariz.), pp. 1763–1767, May 1997).

The preferred embodiment of the present invention relates to a receiver with a two-element array, referred to as a smart antenna receiver. Adaptive arrays are employed to utilize the known direction of arrival and signal waveform structure of desired signal for interference cancellation in point-to-point communication (see, for example, S. P. Applebaum and D. J. Chapman, "Adaptive Arrays With Main Beam Constrains," *IEEE Trans. Antennas Propagat.,* vol. 24, pp. 650–662, September 1976 and J. R. T. Compton, "An Adaptive Array in Speed-Spectrum Communications," *Proc. IEEE,* vol. 66, pp. 289–298, March 1978), wherein by using the pointing vector, the desired signal is co-phased and removed, prior to the application of weighting for interference cancellation. To reduce sensitivity to pointing vector error in a point-to-point communication application, a self-correcting loop was suggested to minimize the error by Y. Bar-Ness and F. Haber ("Self-Correcting Interference Cancelling Processor for Point-to-Point Communications," in *Proceedings of the 24$^{th}$ Midwest Symposium on Circuit and Systems,* (Albuquerque, N.Mex.), pp. 663–665, June 1981).

In multi-user wireless and other similar communication applications, such a pointing vector is not well defined, and hence cannot be used easily or accurately used by a mobile receiver for interference cancellation.

SUMMARY OF THE INVENTION

Briefly described the invention comprises a novel receiver structure for a mobile station that simultaneously estimates the desired signal channel vector and adaptively controls the weights, thereby increasing the SINR at array output. Adaptive control continually corrects the channel vector making it a more meaningful parameter than the prior art's pointing vector in modeling the received signal at mobile stations of cellular CDMA systems.

In a typical IS-95 CDMA mobile station receiver, for example, multiple paths are weighted and combined by a Rake demodulator to combat small-scale fading (ref. Gibson supra and A. J. Viterbi, *CDMA Principles of Spread Spectrum Communication,* Reading, Mass.: Addison-Wesley Publishing Company, 1995). In the current invention, the use of a small antenna structure along with Rake demodulator provides higher SINR at the output for symbol detection, and improves capacity in the forward link.

These and other features of the invention will be more fully understood by reference to the following drawings.

DETAILED DESCRIPTION OF THE INVENTION

During the course of this description, like numbers will be used to identify like elements according to different figures which illustrate the invention.

This invention (10) relates to the receiver structure and the signal model used in the analysis of the proposed receiver scheme. The disclosed smart antenna receiver system of the present invention results in a dramatic capacity improvement over the receivers of the above disclosed prior art.

Several assumptions are made in the development of the signal model. According to the preferred embodiment, the receiver consists of a small antenna array with two elements at a mobile station of a wireless cellular CDMA system. The disclosure assumes that there are one home base station (n=0) and N neighboring base stations, wherein each n (n=0, 1, ..., N) base station serves $J_n$ active users. The signal from each base station is composed of $J_n$ users' information waveforms and one pilot waveform. There are L resolvable paths for each signal. The signal from different paths and different base stations are assumed to independently undergo Rayleigh fading, while the $J_n+1$ waveforms that arrive from the same path and the same base station at a given mobile receiver propagate over the same fading characteristics. According to the above model, the complex envelope of received signal at two antenna elements of the mobile station is given by a 2×1 vector r(t):

$$r(t) = \sum_{n=0}^{N}\sum_{l=1}^{L} c_{nl}(t)$$

$$\left\{\sum_{j=1}^{J_n} \sqrt{P_{nu}} \cdot d_{nj}(t-\tau_{nl})u_{nj}(t-\tau_{nl}) + \sqrt{P_{np}} \cdot u_{np}(t-\tau_{nl})\right\} + v(t)$$

where $c_{nl}(t)$ represents complex channel vectors, $d_{nj}(t)$ are transmitted information bits, $P_{nu}$ and $P_{np}$ are, respectively, the received powers of the users' signals and pilot signals, $u_{nj}(t)$ and $u_{np}(t)$ are the spreading codes, v(t) is AWGN, $\tau_{n1}$ are delays, and n=o refers to desired home base station. The following assumptions are adopted in the analysis:

communication performance is examined for user 1 in cell 0, for which the channel vector can be written as: $c^{ol}=[c_{o/1},c_{o/2}]^\tau$ ($l=1, \ldots, L$), where the superscript denotes transpose.

slow fading is assumed for signals from all paths and all base stations.

Figure 1:
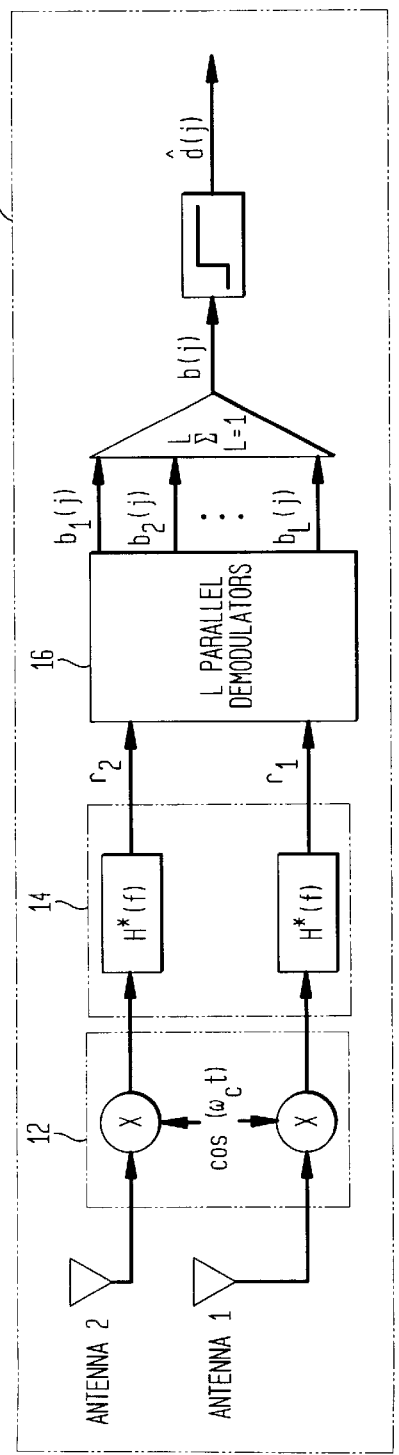
FIG. 1 illustrates the smart antenna structure for BPSK demodulation at a mobile station according to the preferred embodiment of the present invention.
Figure 2:
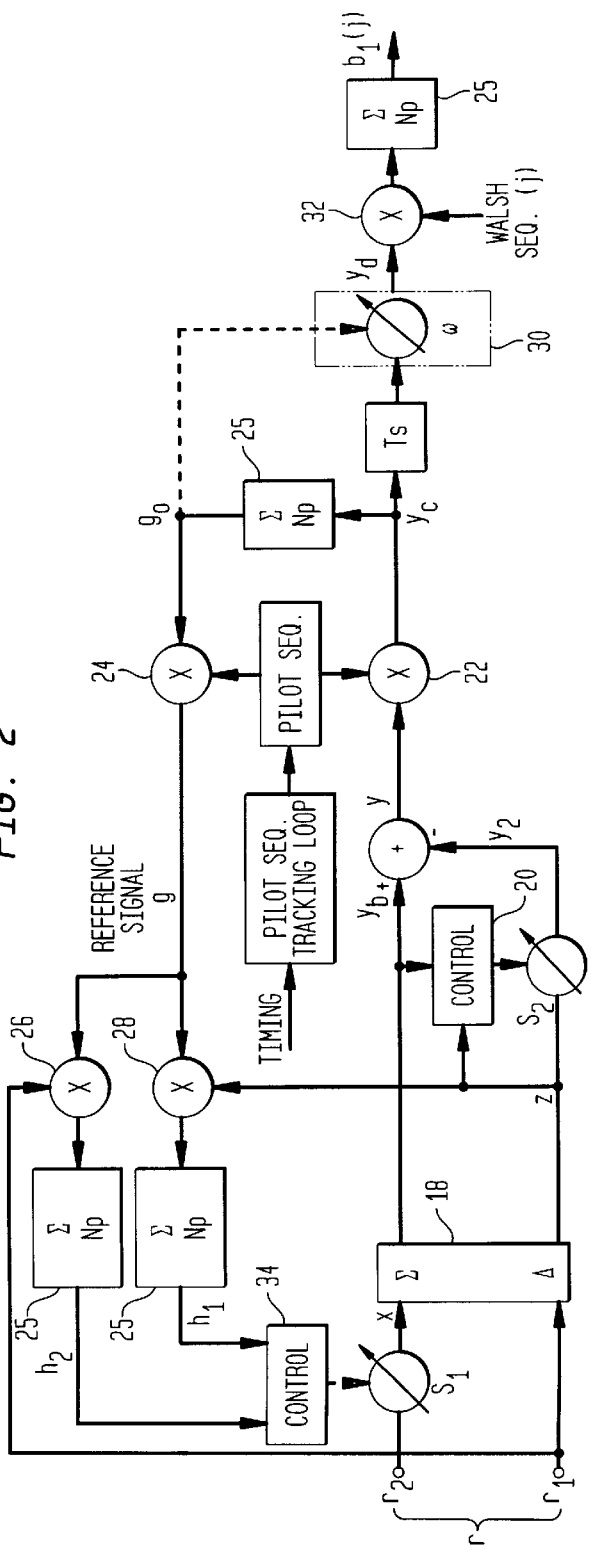
FIG. 2 illustrates a Rake demodulator, according to the preferred embodiment of the present invention, wherein the demodulator has L parallel Rake fingers for the jth user.

FIG. 1 shows the dual antenna receiver at mobile station. After down conversation (12) and matched filtering (14) (matched to the transmitting pulse), the signals received at two antennas are demodulated by L parallel demodulators (16) (Rake fingers). The output of L Rake fingers are combined for a symbol detection. In FIG. 2, all the parameters which are referred to are used in ith Rake finger, hence the path index is ignored. When the weight $s_1=c_{o/1}/c_{o/2}$, the desired signal is co-phase combined at $y_b$, and blocked at z. That is, the z signal output of antenna hybrid (18) consists of only interference as no desired signal is present. In this case, the weight $s_2$ is used to estimate interference, which is subtracted from $y_b$, and higher SINR can be obtained at the array output y and demodulated output $b_l(j)$. The weight $s_2$ can be updated, for example, by Direct Matrix Inversion (DMI) (20).

When $s_1 \neq c_{o/1}/c_{o/2}$, the channel vector estimate is erroneous, and $s_1$ will not result in a null difference between the desired signals received at points x and $r_1$. Consequently, the residual desired signal contributions at z will be interpreted by the array as interference, and hence cancelled. This results in performance degradation of the canceller (reference J. R. T. Compton, "Pointing accuracy and dynamic range in steered beam array," *IEEE Trans. Aerospace and Electronic Systems.*, vol. 16, pp. 280–287, May 1980). To overcome this effect, the preferred embodiment of the present invention uses the spreading code of the desired signal. As shown in the preferred embodiment depicting in FIG. 2, the processor at the mobile station, using the spreading code parameters and the correlator 22, despreads the array output y(t) (marked y) to yield $y_c$. This resulting signal, $y_c$, is then accumulated over one symbol interval and that result, $g_o$ is then respread by correlator 24 using the same respreading code to get a reference signal g. When the kth symbol of desired signal is received, the control signal $h_l(k)$ is generated by accumulating the multiplication of g(k, t) and z(k, t) over one symbol interval, and $h_2(k)$ is obtained similarly from the reference signal g(k, t) and the received signal at the first element. These two control signals can be expressed as $$h_1(k) = \sum_{n_p=1}^{N_p} z(k, n_p)g^*(k, n_p) \quad \text{and} \quad h_2(k) = \sum_{n_p=1}^{N_p} r_1(k, n_p)g^*(k, n_p),$$

where $N_p$ is the number of code chips per bit, and the superscript "*" denotes complex conjugate operation. In FIG. 2 items labeled 25 denote accumulators. The weight $s_1$ is then updated by complex weight controller (34) as:

$$\hat{s}_1(k) = s_1(k) + \frac{h_1(k)}{h_2(k) - h_1(k)} \cdot s_1(k)$$

It can be shown that when a pure reference signal is available at g, this algorithm gives an estimate of the channel vector error between two antenna elements and the weight $s_1=c_{o/1}/c_{o/2}$. Since y has a higher SINR than the array input, the matched filter (30) (matched to the channel attenuation and phase delay) estimated from y is more accurate than the one estimated from the array input $r_1$. The array output y is then despread using correlator 32 using the pilot and jth users' sequences to generate the Ith Rake finger's output $b_l(j)$.

Figure 3:
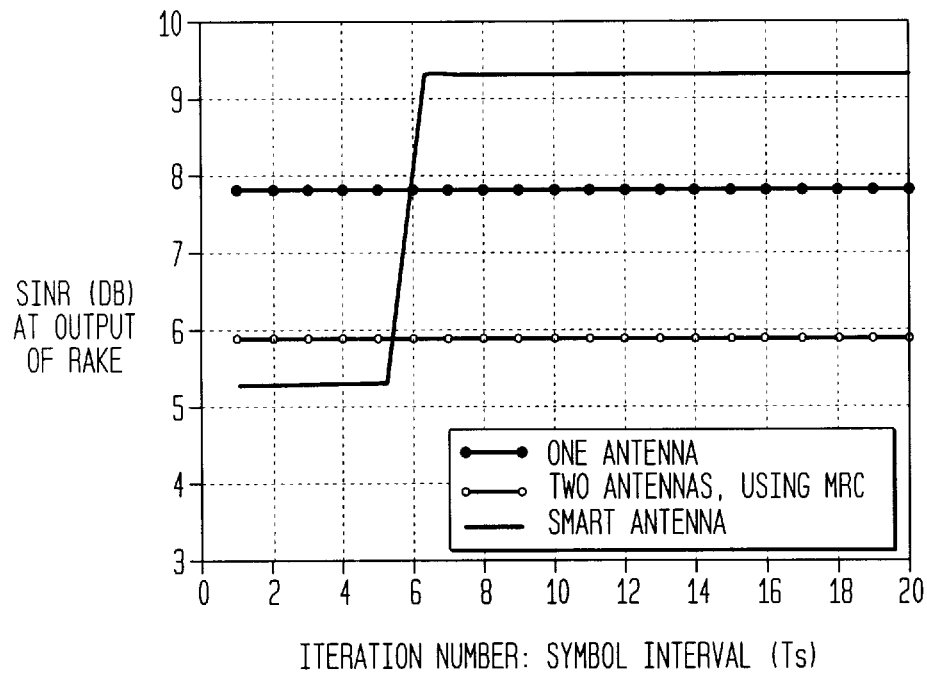
FIG. 3 is a graph of the SINR output versus iteration number for three different antenna systems.

Based on these assumptions and analysis, simulation results were obtained in light of the following additional assumptions. The signal employed the same short code as in IS-95. It was also assumed that 20% of total transmitted power from each base station is used for pilot. Three paths for each signal are present, the relative delay between paths from same base stations is two chips. In each of the Rake fingers, there are one desired signal path from home base station, two interfering paths from home base station (self-interference), and three interfering paths from each of neighboring base stations. For comparison, three receiver models were examined:

1. One antenna followed by Rake demodulator
2. Two antennas with maximum ratio combining (MRS) followed by Rake demodulator
3. The smart antenna of the preferred embodiment, followed by the Rake demodulator In the data depicted in FIG. 3, 20 active users per cell is assumed, with the curves obtained from 1000 Monte Carlo runs. For receivers 1 and 2, the curves are also the average output SINR over bits 1 to 20. For a receiver with smart antenna, from bit 1 to 5, the initial beam steering weight $s_1=1$, the output SINR is averaged from bit 1 to 5. Starting from bit 6, the smart antenna uses the algorithm of the preferred embodiment to control the weight $s_1$, and the output SINR shown in FIG. 3 is averaged over bits 6 to 20. The curves show that after the weight $(s_1)$ correction starts, the receiver with the smart antenna of the preferred embodiment achieved 1.5 dB and 3.5 dB higher output SINR compared to receivers 1 and 2, respectively.

Figure 4:
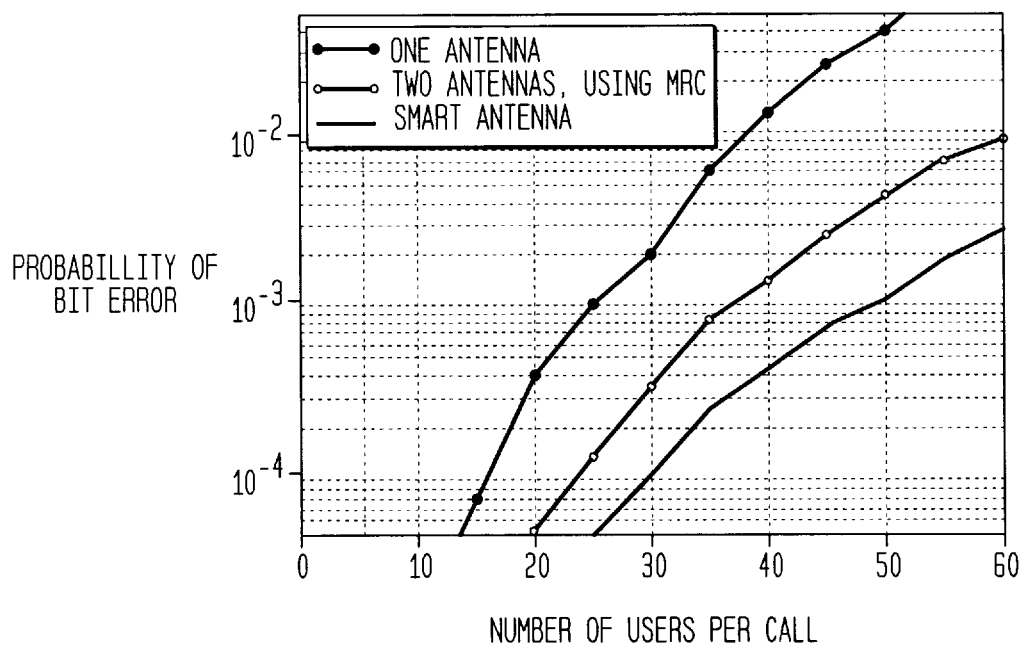
FIG. 4 is a graph of the probability of bit error versus the number of users per cell for three different antenna systems.

To see the capacity improvement due to proposed receiver of the preferred embodiment, FIG. 4 gives the curves of probability of bit error, $P_e$, versus number of users per cell. For performance requirement $P_e=10^{-3}$, the system capacity is 24, 37 and 50 users per cell for receivers 1, 2 and 3, respectively. With the smart antenna of the preferred embodiment at the mobile station, the system capacity increases 108% and 35% compared to receivers 1 and 2, respectively. The proposed receiver structure of the preferred embodiment, therefore, can provide improved capacity over conventional receivers 1 and 2.

While the invention has been described with reference to the above preferred embodiment thereof, it will be appreciated by those of ordinary skill in the art that various modifications can be made to the structure and function of the individual parts of the system without departing from the sprit and scope of the invention as a whole. In particular, the receiver model can be easily extended to the case of QPSK demodulation (rather than the BPSK demodulation depicted in FIGS. 1 and 2) as well as to the cases of Time Domain Multiple Access (TDMA) and Frequency Domain Multiple Access (FDMA) and to usage of polarization instead of spatial information in implementing the interference cancellation.

What is claimed is:

1. An apparatus for reducing neighboring base station interference in a wireless mobile station which receives a signal transmitted from a home base station, said apparatus comprising:

(a) at least two antennas;
   (b) a means for correction that continually corrects a channel vector model of the received signal by utilizing an antenna hybrid device and a pilot signal received from the home base station in order to process the output signal of each antenna;
   (c) an interference cancellation means for using the corrected channel vector model to adaptively control cancellation weights;
   (d) a despreading means for despreading a signal obtained from the output of the antenna hybrid device;
   (e) an accumulator means for accumulating the output of the despreading means over one symbol interval; and,
   (f) a respreading means to respread the accumulator results to yield a reference signal.

2. The apparatus of claim 1 wherein said correction means further comprises a control signal generating means for generating a control signal using said reference signal.

3. The apparatus of claim 2 wherein said cancellation means comprises a complex weight controller using said control signal to update said cancellation weights.

4. The apparatus of claim 3 wherein said correction means comprises a means for utilizing a spread code transmitted in a IS-95 CDMA signaling system.

5. The apparatus of claim 3 wherein the received signal is a BPSK signal.

6. The apparatus of claim 3 wherein the received signal is a QPSK signal.

7. The apparatus of claim 3 wherein the received signal is a Time Domain Multiple Access (TDMA) signal.

8. The apparatus of claim 3 wherein the received signal is a Frequency Domain Multiple Access (FDMA) signal.

9. The apparatus of claim 3 wherein the interference cancellation means comprises a means for utilizing spatial information.

10. The apparatus of claim 3 wherein the interference cancellation means comprises a means for utilizing polarization information.

11. An apparatus for reducing neighboring base station interference in a wireless mobile station receiving a signal transmitted from a home base station, said apparatus comprising:

(a) at least two antennas;
    (b) means for using a pilot signal received from the home base station and an antenna hybrid device to continually correct a channel vector model of the received signal; and,
    (c) an interference cancellation means for using the corrected channel vector model to adaptively control cancellation weights.

* * * * *